J. C. Cunningham,
Mill Gearing

N° 70,970.  Patented Nov. 19, 1867.

Witnesses:  
Theo Fusch  
J. A. Serviel

Inventor:  
J. C. Cunningham  
Per Munn & Co  
Att'ys.

United States Patent Office.

JOSHUA C. CUNNINGHAM, OF OGLETHORPE, GEORGIA.

Letters Patent No. 70,970, dated November 19, 1867.

IMPROVEMENT IN MILL-GEARING.

*The Schedule referred to in these Letters Patent and making part of the same.*

TO ALL WHOM IT MAY CONCERN:

Be it known that I, JOSHUA C. CUNNINGHAM, of Oglethorpe, in the county of Macon, and State of Georgia, have invented a new and useful Improvement in Mill-Gearing; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention consists in the combination and arrangement of the stationary base-wheel, the gear or pinion-wheels, and the arms upon which they revolve, and the crown-wheel, with each other, and with the main or driving-shaft, as hereinafter more fully described, so as to obtain a greatly increased velocity at the expense of a very slight loss of power.

Figure 1:
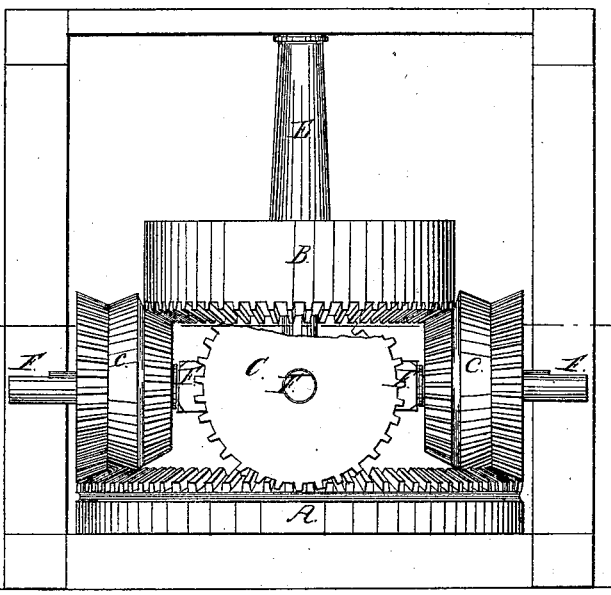
Figure 1 is a side view of my improved gearing, part of one of the wheels being broken away to show the construction.
Figure 2:
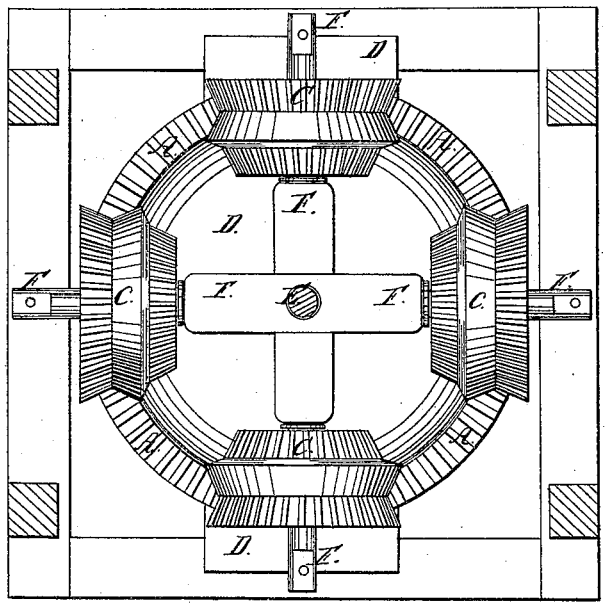
Figure 2 is a horizontal section of the same, taken through the line $x\ x$, fig. 1.

A is the base-wheel, which is securely bolted to the bridge-tree D. E is the main or driving-shaft, from which motion is communicated to the machinery to be driven, and the lower end of which is pivoted to the bridge-tree D in the ordinary manner. The cog or pinion-wheels C revolve loosely upon journals formed upon the arms F, which are framed together, and through a hole in the centre of which the shaft E passes; the hole being sufficiently large to allow the arms F and shaft E to move independently of each other. The ends of the arms F project beyond the wheels C, as shown in the drawings, and to these projecting ends is securely attached the water-wheel, from which the motion is obtained. The wheels C are made with two sets of cogs or pinions, the one around the circumference of their outer ends, and the other around the circumference of their inner ends, as shown in the drawings. The inner set being of less diameter than the outer, and having a less number of cogs, I usually make the inner set with twenty cogs, and the outer set with twenty-four. B is the crown-wheel, which is attached to and carries with it the shaft E. Upon the lower side of the wheel B is formed or to it is securely attached a set of cogs, which mesh into the inner set of cogs of the wheels C, as shown in fig. 1. I usually form the wheel B with forty cogs, and the stationary base-wheel A with fifty-six cogs, so that a single revolution of the arms F, to which the water-wheel is attached, will cause the wheel B and shaft E to revolve two and one-sixth times, thus greatly increasing the velocity with which the machinery is driven without loss of power, except the slight loss from the friction of the wheels C.

I claim as new, and desire to secure by Letters Patent—

The pinion-wheels C, each composed of two sets of cogs, and of unequal diameters, in combination with the base A, crown-gear wheel B, and shafts F, all arranged and operating as described, for the purpose specified.

JOSHUA C. CUNNINGHAM.

Witnesses:
THOS. P. LOYD,
JNO. M. GREER.